Aug. 24, 1965 I. STEIN 3,202,770
HALL EFFECT READOUT DEVICE
Filed July 26, 1962
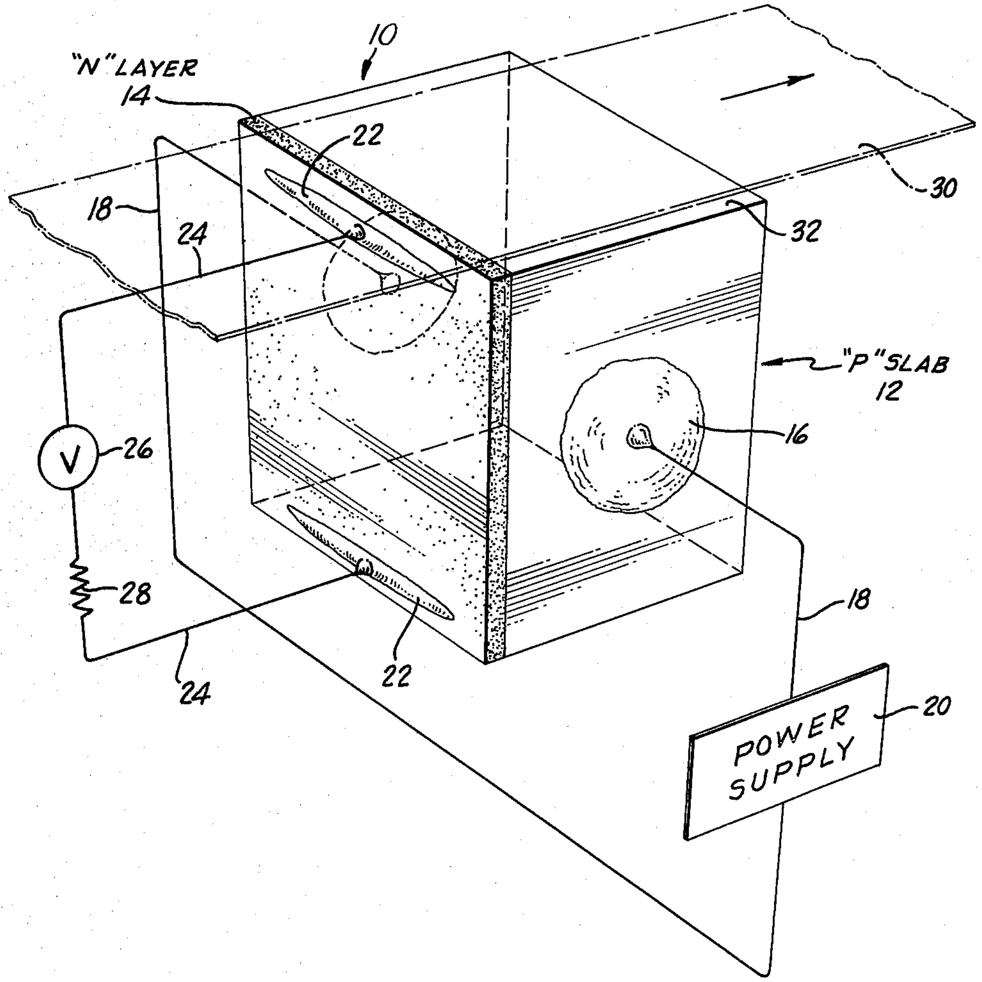
IRVING STEIN
INVENTOR.
BY Nathan N. Kallman
ATTORNEY 3,202,770

HALL EFFECT READOUT DEVICE

Irving Stein, Palo Alto, Calif., assignor to Ampex Corporation, Redwood City, Calif., a corporation of California Filed July 26, 1962, Ser. No. 212,635
12 Claims. (Cl. 179—100.2)

This invention relates to signal readout devices, and in particular to reproduce devices that employ the Hall effect to achieve readout of a magnetically recorded signal.

Generally, magnetic transducers or heads formed from a magnetic material, such as Permalloy or ferrite, are employed to sense signal information that has been previously recorded on a magnetic tape in the form of magnetization. However, with such known magnetic heads, the resolution of the reproduced signal is dependent upon the speed of the tape relative to the head, and therefore suffers from tape speed variations. In addition, the width and structure of the nonmagnetic gap formed in the transducer for sensing the rate of change of flux or magnetization affects the quality of the reproduced signal, and transducers formed with such gaps are relatively expensive to manufacture and maintain because the gap area is subject to wear and subsequent deterioration.

It is known that if a magnetic field, H, is applied perpendicular to a current flow, I, in any conductor, the moving charges that constitute the current I are deflected and build up a potential difference, V, between two sides of the conductor. The creation of this transverse electric field, perpendicular to both the magnetic field and the original current flow, is called the Hall effect. It is also known that certain materials, such as indium arsenide or indium antimonide, exhibit the Hall effect to a considerably larger extent than metals, and may be used as transducers or heads to detect the magnetization pattern on a magnetic medium or tape.

A Hall effect head (hereafter designated as a Hall head) has particular characteristics that makes it extremely desirable for the playback of information recorded on a magnetic tape. Hall heads require less space than conventional magnetic heads, because they may be made as very thin sections and do not need coupling coils. A Hall head has a frequency response ranging from signals in the very low frequency range approaching D.C. up to the kilomegacycles per second range. Furthermore, Hall heads are flux sensitive and thus sense the magnetic field associated with the recorded tape, in contrast to magnetic heads that detect the rate of change of flux of a recorded tape which necessitates tape motion at certain controlled speeds relative to the magnetic head for proper frequency response. Also, because Hall effect materials are nonmagnetic, the Hall heads do not cause distortion of the magnetic field associated with the tape, so that good resolution of the sensed and reproduced signal is possible.

Hall effect devices have two controllable parameters; the strength of the magnetic field H and the magnitude of the applied current I. Since the output voltage V of a Hall effect device is proportional to the product of the input current I and the applied magnetic field H, if I is constant the output voltage is proportional to H. Thus an output voltage representing a magnetically recorded signal may be derived from a Hall head that senses the magnetic flux associated with a recorded tape. Therefore, it would be highly desirable to provide a Hall head in a magnetic tape reproducer.

However, there are certain difficulties experienced with known Hall transducers or heads. Namely, Hall heads must be made in extremely thin layers to achieve proper response to short wavelength signals and to provide good resolution. However, such extremely thin films are not structurally stable and are difficult to manufacture. In addition, extremely thin films, made by presently known methods are polycrystalline so that the mobility of the free electrons or charges that constitute the current is very small. Therefore, the output signal derived from the Hall head is relatively weak, because the power transfer efficiency of a Hall device depends upon the square of the mobility of the charge carrier. Mobility is the ratio of the velocity of charge carriers in a solid to the electric field intensity responsible for their motion. However, known Hall reproduce heads are faced with the dilemma of either being relatively thick in order to provide a sufficient output signal, thereby sacrificing bandwidth capability; or being very thin and subject to structural difficulties both in manufacturing and maintenance, in addition to having low electron mobility resulting in a weak output signal.

An object of this invention is to provide an improved signal readout device that employs the Hall effect.

Another object of this invention is to provide a thin film Hall head within high electron mobility is achieved thereby assuring improved signal output and resolution during readout of a recorded magnetic medium.

According to this invention, a readout apparatus for playing back magnetically recorded signals from a magnetic medium or tape comprises a Hall effect device that is formed as a single crystal semiconductive wafer with a high resistivity, low mobility P-type slab. A very thin region of high mobility N-type material is disposed coextensively along one major surface of the P-type slab. The recorded magnetic medium traverses one side of the slab, while a source of steady current is applied across two other sides of the slab, such sides being substantially perpendicular to the side traversed by the medium. These sides are orthogonally disposed relative to the major surfaces of the P-type slab, and each side includes P-type as well as the N-type material.

The combination of the applied current and vaying magnetic flux from the medium serves to develop an electronic potential that is representative of the magnetically recorded signal. This potential may be detected as an output voltage by a signal readout circuit, which may be a voltmeter or other voltage measuring apparatus by way of example, that is coupled by ohmic contacts to one of the major surfaces of the slab. In this manner, magnetically recorded signals covering a wide bandwidth may be read out efficiently by use of a simple Hall effect head having an N-type material region disposed on one surface of a P-type slab.

The invention will be described in greater detail with reference to the sole figure of the drawing, which is a perspective view of an embodiment of a Hall head, in accordance with this invention.

In the sole figure of the drawing, a Hall head 10 comprises a P-type slab 12 having an N-type material 14 deposited coextensively along a surface of the slab 12. The Hall head 10 of this invention may be formed from a slab of P-type indium arsenide that is doped with selenium or tellurium or a material selected from the elements of Group VI A to form an N-type layer 14. This may be achieved by evaporating the doping material at a temperature of about 350° centigrade for example, so that the material in gaseous form is diffused along one surface of the P-type layer. After about twenty minutes, the temperature may then be raised to 500° centrigrade to dilute the concentration of the gaseous material along the outer surface of the P-type slab 12 by causing a migration of the atoms of the doping material further into the slab 12. The result is a wafer-like structure with a P-type slab 12 having a thickness between .0005 inch to .005 inch and an N-type stratum 14 having a thickness of approximately $\frac{1}{20}$ of that of the P-type slab 12. Such a structure may be manufactured by employing any of the processes known as "double diffusion," or predeposition with "in diffusion," epitaxial growth, floating zone method of refining or Czochralski pooling, or a combination of these. The structure may be reinforced by use of a supporting nonmagnetic layer (not shown), which may be an acetate, Mylar or glass base, by way of example.

Thereafter, at ambient temperature ohmic contacts 16 are deposited by soldering, plating, or other means on the sides of the basic Hall effect structure 10, and electrical leads 18 are attached thereto for providing a means for applying an input current I from a current source or power supply 20. A pair of ohmic contacts 22 are formed on one surface of the structure 10 and terminal leads 24 are coupled thereto in order to provide an output signal measuring means in conjunction with a voltmeter 26 connected in series with a load resistor 28. The output leads 24 are located on a vertical line that is at substantially the same potential when a magnetic field is absent. The Hall structure 10 may then be encapsulated in an epoxy resin (not shown), with the projecting leads 18 and 24 available for connection to external supply and voltage measuring means respectively.

In operation, a prerecorded magnetic medium or tape 30, shown partially in the figure, traverses a side 32 of the structure, while a current I is applied from the source 20 to the Hall effect head 10. The current may be direct current (D.C.) or alternating current (A.C.) but preferably has a constant amplitude. It should be noted that if the magnetic field applied to the Hall head is A.C., the output leads 24 should be kept in a plane parallel to the flux lines to prevent an error voltage from being induced. As the recorded signal on the tape 30 varies, the magnetic flux in the Hall head varies proportionately causing a change in the voltage signal, which is detected in a well known manner.

The Hall head of this invention can also sense the magnetization of a recorded signal on the tape 30 adjacent to the Hall head, even when the tape 30 is motionless. This feature may be useful in systems where errors in recorded signals need be detected, and rerecording of the correct signal at the immediate tape area being checked is required; because the location and marking of such area may be made easily while the tape is stationary. Another feature of this invention is that very little voltage is developed across the highly resistive, low conductivity P-type slab, which does not act as a detector and therefore shorting of the circuit path defined by the Hall head 10 is prevented. Still another feature of this Hall head is that no junction barrier is required between the N-type and P-type regions. Of special interest is the fact that wide-band, short wavelength signals may be effectively processed by the Hall head of this invention with all the above added advantages.

There has been described herein an improved Hall effect reproduce head formed from a P-type slab with an N-type stratum on one surface of the slab. The N-type layer affords high electron mobility and improved sensitivity thereby allowing an improved output signal to be derived. The P-type material is relatively highly resistive and of low mobility and prevents shorting of the electrical circuit.

It is understood that the scope of this invention is not necessarily limited to the materials, dimensions or other parameters set forth above. For example, the P-type slab may be formed from indium antimonide or other semiconductor material that may be doped to form a P-type layer. Also, the diffusion of the doping material to form an N-type region may be effectuated by means other than evaporation.

What is claimed is:

1. A Hall effect reproduce head for playback of an information signal comprising:
a layer of a P-type semiconductive material;
a very thin region of N-type material disposed along one surface of said layer;
current means for applying a current to said layer and Hall voltage sensing means for sensing the potential difference developed along said very thin region, whereby an information signal applied to said very thin region results in a voltage proportional to said information signal.

2. A Hall effect reproduce head for playback of an information signal recorded on a magnetic medium comprising:
a P-type semiconductor slab having a relatively high resistivity located substantially perpendicular to the direction of movement of said magnetic medium;
an N-type semiconductor layer on a surface of said slab located perpendicular to the direction of travel of said magnetic medium and, the layer being thin relative to the thickness of the slab and providing a stratum of high electron mobility;
current means for supplying a current to said P-type slab; and Hall voltage sense means coupled to said N-type layer for sensing the voltage difference developed along said layer as a result of the magnetic medium passing in close proximity to said layer and applying a magnetic field thereto.

3. The structure recited in claim 2 wherein said P-type semiconductor slab and said N-type semiconductor layer are monocrystalline semiconductor materials and said P-type semiconductor slab has a pair of surfaces substantially parallel to the edge of said magnetic medium and a surface substantially perpendicular to the direction of travel of said magnetic medium, said current means connected to said parallel surfaces while said layer and said Hall voltage means is connected to said perpendicular surface.

4. The structure recited in claim 3 wherein said N-type layer is $\frac{1}{20}$ the thickness of said slab and less than 0.005 inch.

5. A Hall effect reproduce head for playback of an information signal comprising:
a layer of a P-type semiconductive material from the group consisting of indium arsenide and indium antimonide;
a very thin N-type stratum coextensively disposed along one surface of said layer formed by a diffusion of an element from the group consisting of selenium or tellurium;
current means for applying a current to said layer and Hall voltage sensing means for sensing the potential difference developed along said very thin stratum, whereby an information signal applied to said very thin region results in a voltage proportional to said information signal.

6. A Hall effect reproduce head for playback of an information signal recorded on a magnetic medium comprising:
a P-type slab having a relatively high resistivity;
an N-type layer disposed on a surface of said slab, the layer being thin relative to the thickness of the slab and providing a stratum of high electron mobility;
means for applying a current to said slab; and
means for deriving an output voltage from said layer.

7. A Hall effect reproduce head for playback of an information signal recorded on a magnetic medium comprising:
a P-type slab having a relatively high resistivity;
an N-type layer disposed on a surface of said slab, the layer being thin relative to the thickness of the slab and providing a stratum of high electron mobility;
a current source coupled to opposing sides of said slab; and
a voltage measuring device coupled to a surface of the reproduce head, such surface being orthogonally disposed relative to the opposing sides.

8. A Hall effect reproduce head for playback of an information signal recorded on a moving magnetic medium comprising:

a P-type slab having a relatively high resistivity;

an N-type layer disposed on a surface of said slab, the layer being thin relative to the thickness of the slab and providing a stratum of high electron mobility;

means for applying a current having a constant magnitude to the slab, such applying means including a pair of ohmic contacts disposed on opposing sides of the slab; and means for deriving an output voltage representative of the recorded signal coupled to a surface of the slab including a pair of ohmic contacts, such surface being perpendicular to the opposing sides of the slab and to the path of motion of the medium.

9. A Hall effect reproduce head for playback of an information signal recorded on a moving magnetic medium comprising:

a P-type slab having a relatively high resistivity;

an N-type layer disposed on a surface of said slab, the layer being thin relative to the thickness of the slab and providing a stratum of high electron mobility;

means for applying an alternating current having a constant magnitude to the slab, such applying means including a first pair of ohmic contacts disposed on opposing sides of the slab; and means for deriving an output voltage representative of the recorded signal coupled to a surface of the slab including a second pair of ohmic contacts, such surface being perpendicular to the opposing sides of the slab and to the path of motion of the medium, such second pair of contacts being spaced substantially perpendicularly relative to the spaced first pair of contacts.

10. A Hall effect reproduce head for playback of an information signal recorded on a moving magnetic medium comprising:

a P-type slab having a relatively high resistivity;

an N-type layer disposed on a surface of said slab, the layer having a thickness of about $\frac{1}{20}$ of the thickness of the slab and providing a stratum of high electron mobility;

means for applying a current having a constant magnitude to the slab, such applying means including a pair of ohmic contacts disposed on opposing sides of the slab; and means for deriving an output voltage representative of the recorded signal coupled to a surface of the slab including a pair of ohmic contacts, such surface being substantially perpendicular to the opposing sides and to the path of motion of the medium.

11. A Hall effect reproduce head for playback of an information signal recorded on a magnetic medium comprising: a monocrystalline semiconductor slab having a first conductivity type and a relatively high resistivity, said slab having a surface located substantially perpendicular to the direction of movement of said magnetic medium and in close proximity to said medium so that a magnetic field is applied thereto; a monocrystalline semiconductor layer having a conductivity type opposite to said slab on said perpendicular surface of said slab, the layer being thin relative to the thickness of the slab; a current means for supplying a current to said slab; and Hall voltage sense means coupled to said layer for sensing the voltage difference developed along said layer as a result of the magnetic medium passing in close proximity to said layer and applying a magnetic field thereto.

12. The structure recited in claim 11 wherein said layer is $\frac{1}{20}$ the thickness of said slab.

References Cited by the Examiner

UNITED STATES PATENTS

| | | | |
|---|---|---|---|
| 2,916,639 | 12/59 | Krembs | 179—100.2 |
| 3,010,033 | 11/61 | Noyce | 317—234 |

IRVING L. SRAGOW, *Primary Examiner.*